United States Patent [19]

Ohshima

[11] Patent Number: 5,172,284
[45] Date of Patent: Dec. 15, 1992

[54] CASSETTE LOADING MECHANISM FOR LOADING CASSETTE WITH SLIDING SHUTTER OVER TAPE OPENING OF CASSETTE WITH NO SHUTTER

[75] Inventor: Mineo Ohshima, Yawata, Japan

[73] Assignee: Matsushita Electric Industrial Co., Ltd., Osaka, Japan

[21] Appl. No.: 660,032

[22] Filed: Feb. 26, 1991

[30] Foreign Application Priority Data

Feb. 26, 1990 [JP] Japan .................. 2-44909

[51] Int. Cl.⁵ ............................. G11B 5/008
[52] U.S. Cl. ..................... 360/94; 360/96.6
[58] Field of Search ................. 360/94, 96.6

[56] References Cited

U.S. PATENT DOCUMENTS

| | | |
|---|---|---|
| 4,618,903 | 10/1986 | Oishi et al. |
| 4,620,254 | 10/1986 | Smith, II |
| 5,005,092 | 4/1991 | Shigenai .................. 360/99.06 |

FOREIGN PATENT DOCUMENTS

| | | |
|---|---|---|
| 0311390 | 4/1989 | European Pat. Off. |
| 0406943 | 1/1991 | European Pat. Off. |
| 0438144 | 7/1991 | European Pat. Off. |
| 3433705 | 4/1985 | Fed. Rep. of Germany |
| 59-171090 | 9/1984 | Japan |

*Primary Examiner*—A. J. Heinz
*Attorney, Agent, or Firm*—Wenderoth, Lind & Ponack

[57] ABSTRACT

A cassette loading mechanism operable with either one of first and second cassettes each accommodating therein a reeled magnetic recording tape. The first cassette is of a type having a uniform thickness and a head access window and at least one roller access window defined at a front thereof and also has a normally closed slide shutter for selectively opening and closing both of the head and roller access windows. The second cassette has a head access window and at least one roller access window defined at a bulged region at a front thereof and has therefore maximum and minimum thicknesses. The cassette loading mechanism has spaced apart holders for holding either one of the first and second cassettes, a detecting lever assembly movable in a plane parallel to a cassette inserting plane between first and second positions and also for movement in a direction generally diverging from the cassette inserting plane. The assembly normally biased to the first position by a biasing element is moved towards the second position in response to the insertion of only the first tape cassette. The assembly includes an actuating element for moving the slide shutter towards the opened position as the lever assembly is moved towards the second position. The lever assembly is also moved in a direction away from the cassette inserting plane in the event that the second tape cassette is inserted to allow the bulged region of the second tape cassette to pass clear of the actuating element.

5 Claims, 7 Drawing Sheets

CASSETTE LOADING MECHANISM FOR LOADING CASSETTE WITH SLIDING SHUTTER OVER TAPE OPENING OF CASSETTE WITH NO SHUTTER

CROSS-REFERENCE TO RELATED APPLICATION

U.S. Pat. application entitled "Tape Cassette" and filed Jan. 19, 1991, Ser. No. 07/640,734 in the name of Mineo Ohshima and Akinobu Fujikawa.

BACKGROUND OF THE INVENTION

1. Field of the Invention

The present invention relates generally to a magnetic recording and/or reproducing apparatus operable with tape cassettes and, more particularly, to a cassette loading mechanism for use in the magnetic recording and/or reproducing apparatus.

2. Description of the Prior Art

A magnetic recording and/or reproducing apparatus, hereinafter referred to as a cassette tape player, for recording and reproducing audio and/or video information on and from a reeled magnetic recording tape is commercially available in a number of types and makes use of a tape cassette of varying dimensions. For example, one type of cassette tape player makes use of such a tape cassette as shown in FIG. 9 of the accompanying drawings and another type makes use of such a tape cassette as shown in FIG. 10. Because of the nature of the cassette loading mechanism herein disclosed in accordance with the present invention, the details of each of the tape cassettes shown respectively in FIGS. 9 and 10 will now be discussed.

The tape cassette, generally identified by 31 in FIG. 9, is very popular in the market and is hereinafter referred to as a compact cassette for the purpose of the present invention. This compact cassette 31 comprises a cassette casing 33 of generally rectangular box-like configuration including rectangular top and bottom panels, generally identified by 33a (although only the top panel is shown), a pair of end walls, generally identified by 33b and opposite to each other, and front and rear walls opposite to each other (only the front wall being shown by 33c). One of the front and rear walls, which confronts both a magnetic recording and/or reproducing head and a pinch roller when the compact cassette 31 is loaded in the cassette tape player, for example, the front wall 33c so far shown, has a perforated and bulged region provided with a head access window 34 and a pair of roller access windows 35a and 35b. The head access window 34 is defined in the perforated and bulged region of the front end wall 33c at a position intermediate of the length thereof whereas the roller access windows 35a and 35b are defined therein at respective positions one on each side of the head access window 34. The perforated and bulged region of the front wall 33c has a predetermined width, indicated by A, which is greater than the width B of the remaining portion of the front wall 33c, said width B being equal to the width of any one of the rear wall and the end walls 33b.

Respective portions of the top and bottom panels 33a adjacent the perforated and bulged region of the front wall 33c are bulged outwardly away from each other in correspondence with an increase in width of the front wall 33c to the predetermined width A, with outer surfaces thereof lying parallel to and raised from those of the remaining portions of the top and bottom panels 33a as indicated by 36. Each of those raised portions 36 of the top and bottom panels 33a generally has a trapezoidal shape with the base of the trapezoidal shape being occupied by the perforated region of the front wall 33c and is delimited by a pair of sloped side banks 37a and 37c, which are inclined relative to the front wall 33c so as to converge with each other, and a sloped longitudinal bank 37b extending parallel to the front wall 33c.

The compact cassette 31 referred to above may be said to have maximum and minimum thicknesses over the entire area thereof, the minimum thickness corresponding to the width B while the maximum thickness corresponds to the width A of the intermediate region of the front wall 33c. The maximum thickness corresponding to the width A of the intermediate region of the front wall 33c accounts for the distance between outermost surfaces of the respective raised portions 36 of the top and bottom panels 33a forming the cassette casing 33.

As is well known to those skilled in the art, two reels are accommodated within the cassette casing 33 and spaced apart from each other in a direction parallel to the longitudinal sense of the cassette casing 33. Within this cassette casing 33, there is accommodated a length of magnetic recording tape 32 having its opposite ends secured to the respective reels extends from one reel to the other reel, traversing the windows 35a, 32 and 35b. As a matter of course, those discrete portions of the length of magnetic recording tape 32 which traverse the windows 35a, 32 and 35b are exposed to the outside through those windows 35a, 32 and 35b.

The compact cassette 31 of the above described construction is well known to those skilled in the art and is generally standardized in dimension and configuration. Although the compact cassette 31 is largely employed for recording and/or reproducing information on and from the reeled magnetic tape, it has a problem in that dust afloat in the air and/or finger prints have access to the discrete portions of the length of magnetic tape which are exposed to the outside through the windows 34, 35a and 35b. Once the length of magnetic tape in the compact cassette 31 is contaminated with the foreign matter, satisfactory information recording and/or reproduction may be hampered.

The foregoing problem inherent in the conventional compact cassette of the type shown in and described with reference to FIG. 9 is not found in a different tape cassette such as, for example, a video tape cassette or a digital audio tape cassette, because the latter type makes use of a protective cover such as a shutter for concealing the length of tape from the outside when the cassette is not in use. With this different tape cassette which is hereinafter referred to as a DAT (digital audio tape) cassette, a length of magnetic tape is adapted to be drawn outwardly from the cassette in readiness for information recording or reproduction when this DAT cassette is in use and after the shutter, cover or lid has been pivoted to open.

In the video tape cassette or the DAT cassette, so long as the shutter is in a closed position, foreign matter will not substnatially enter the cassette. However, as the DAT cassette is loaded into the cassette tape player in readiness for the information recording or reproduction, the shutter is pivoted to an opened position so that, after the DAT cassette has completely been loaded into the cassette tape player, that length of magnetic tape can be drawn outwardly from the cassette in readiness for contact thereof with a magnetic recording and/or reproducing head. That portion of the tape drawn outwardly from the DAT cassette may be contaminated with foreign matter such as dust afloat in the environment.

The DAT cassette has another problem in that, during a pivotal motion of the shutter and so long as the shutter is held in the opened position, the cassette as a whole tends to occupy a relatively large space, hampering, or imposing a limitation on, a reduction in size of the cassette tape player.

When it comes to an information recording or reproduction on and from a length of magnetic tape, respectively, the compact tape cassette, the video tape cassette and the DAT cassette, all being available in the market, require the use of different players each having a different cassette loading mechanism designed to suit to the respective cassette.

SUMMARY OF THE INVENTION

In view of the foregoing, the present invention has been devised to substantially eliminate the above discussed problems and is intended to provide an improved cassette loading mechanism operable with any one of at least first and second tape cassettes of different design, one of which may be the compact tape cassette while the other is a specially designed tape cassette of a configuration generally similar to the compact tape cassette, but having a slide shutter for selectively opening and closing a head access window.

According to the present invention, there is disclosed a cassette loading mechanism operable with any one of first and second tape cassettes. The first tape cassette may be of a type disclosed in the copending U.S. application referred to in the CROSS-REFERENCE TO THE RELATED APPLICATION and may be said to comprise a cassette casing of generally rectangular box-like configuration having a pair of end portions opposite to each other in a direction longitudinally thereof; front and rear portions each parallel to the longitudinal sense of the rectangular box-like configuration, said front portion having a perforated region of a width substantially equal to the remaining region of the front portion; a head access window defined in the perforated region of the front portion of the cassette shell for the access of a magnetic recording and/or reproducing head to a length of magnetic recording tape reeled within the tape cassette; at least one roller access window defined in the perforated region of the front portion of the cassette casing in the neighborhood of the head access window; a normally closed slide shutter slidably mounted on the front portion of the tape cassette for movement between opened and closed positions for selectively opening and closing both of the head and roller access windows; and a biasing element for biasing the slide shutter to the closed position.

The second tape cassette utilizable in the cassette loading mechanism of the present invention may be of a type well known in the art and may be said to comprise a cassette casing of generally rectangular box-like configuration having a pair of end portions opposite to each other in a direction longitudinally thereof; front and rear portions each parallel to the longitudinal sense of the rectangular box-like configuration, said front portion having an outwardly bulged region of a width greater than the width of the front portion of the first tape cassette and also than that of the remaining region of the front portion thereof; a head access window defined in the bulged region of the front portion for the access of the magnetic head to a length of magnetic recording tape reeled within the cassette shell; and at least one roller access window defined in the bulged region of the front portion in the neighborhood of the head access window.

In accordance with the present invention, the cassette loading mechanism comprises a cassette holding means comprising a pair of holders spaced from each other a distance corresponding to the length of either one of the first and second tape cassettes, either one of said first and second tape cassettes being capable of being inserted along the holders to a completely inserted position with its opposite end portions slidably received thereby, and a lever means carried by the cassette holding means for movement in a plane parallel to a cassette inserting plane along which either one of the tape cassettes is inserted, between first and second positions and also for movement in a direction generally diverging from said cassette inserting plane. The lever means referred to above is normally biased to the first position by a biasing element and is moved from the first position towards the second position in response to the insertion of only the first tape cassette towards the completely inserted position. The lever means includes an actuating element for moving the slide shutter from the closed position towards the opened position as the lever means is moved from the first position towards the second position. The lever means is moved in a direction away from the cassette inserting plane in the event that the second tape cassette is inserted to allow the bulged perforated region of the front portion of the second tape cassette to pass clear of the actuating element during the insertion of the second tape cassette towards the completely inserted position.

Preferably, the lever means comprises a detector lever displaceable in a direction away from the cassette inserting plane, and a pivot lever pivotable between the first and second positions and having the actuating element secured thereto.

Preferably, the cassette loading mechanism further comprises a restricting means engageable with the rear portion of either one of the first and second tape cassette to hold the tape cassette at a position with the rear portion thereof spaced a distance from the magnetic recording and/or reproducing head in the event that either one of the first and second tape cassettes is inserted in a wrong way.

BRIEF DESCRIPTION OF THE DRAWINGS

This and other objects and features of the present invention will readily be understood from the following description of preferred embodiments thereof with reference to the accompanying drawings, in which.

DETAILED DESCRIPTION OF THE EMBODIMENT

Figure 1:
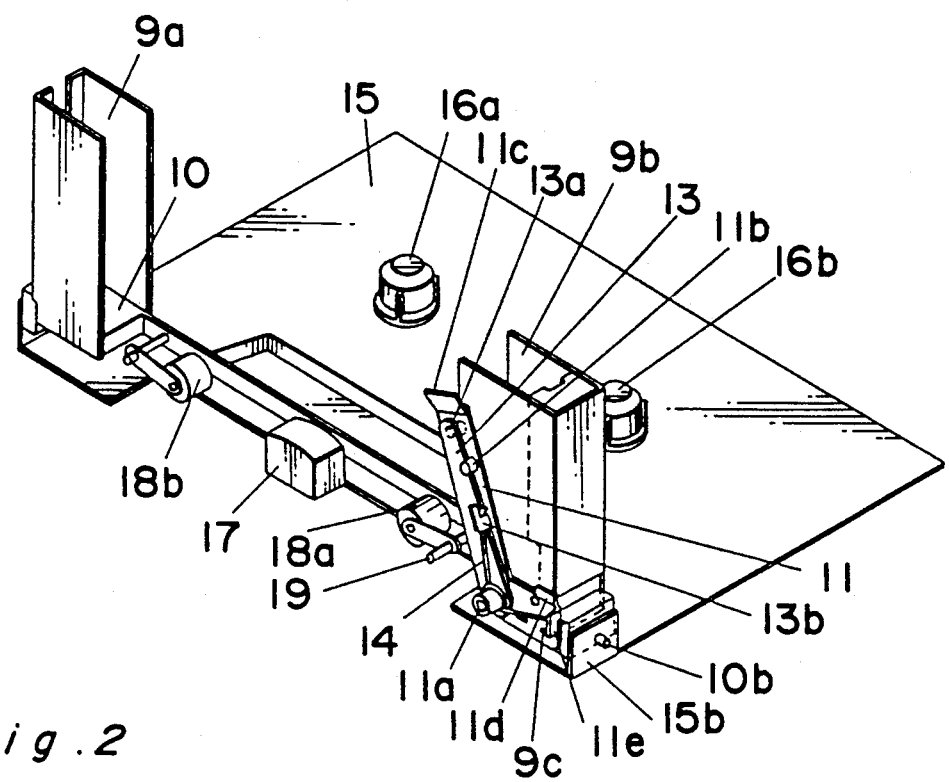
FIG. 1 is a perspective view showing a cassette loading mechanism according to a first preferred embodiment of the present invention.

Before the description of the present invention proceeds, it is to be noted that like parts are designated by like reference numerals throughout the accompanying drawings.

It is also to be noted that the cassette loading mechanism herein disclosed in accordance with the present invention is designed to operate with either one of the conventional tape cassette of the construction shown in and described with reference to FIG. 9, and a tape cassette of a construction shown in FIGS. 10 and 11. Accordingly, in describing the preferred embodiments of the present invention, the conventional tape cassette of FIG. 9 and the tape cassette of FIGS. 10 and 11 are referred to as "conventional tape cassette" (or "conventional cassette" for short) and "modified tape cassette" (or "modified cassette" for short), respectively.

The details of the modified cassette referred to above will first be described with particular reference to FIGS. 10 and 11. The modified cassette, generally identified by 1 in FIGS. 10 and 11, does as is the case with the conventional cassette 31, accommodates therein the reeled magnetic tape. As best shown in FIG. 10, the modified cassette 1 comprises a cassette casing 3 of generally rectangular box-like configuration having a thickness substantially uniform over the entire area thereof and including rectangular top and bottom panels, generally identified by 3a (although only the top panel is shown), a pair of end walls, generally identified by 3b and opposite to each other, and front and rear walls opposite to each other (only the front wall being shown by 3c).

The front wall 3c of the cassette casing 3 which confronts a magnetic recording and/or reproducing head shown by 17 in FIGS. 1, 2, 4, 5 and 8 when the modified cassette 1 is loaded into the cassette loading mechanism of the present invention as will be described later. This front wall 3c is provided with a head access window 4 positioned intermediate of the length thereof and a pair of roller access windows 5a and 5b each on one side of the head access window 4, said head and roller access windows 4 and 5a and 5b functioning in respective manners identical with those of the head and roller access windows 34 and 35a and 35b in the conventional cassette 31. Considering the purpose for which the present invention is provided, those windows 4, 5a and 5b in the front wall 3c of the modified cassette are so defined and so positioned as to match with the windows 34, 35a and 35b in the front wall 33c of the conventional cassette 31.

The modified cassette 1 also comprises a generally U-sectioned shutter 8 mounted on the cassette casing 3 so as to encompass a substantial portion of the front wall 3c and respective front edge portions of the top and bottom panels 3a adjacent the front wall 3c. This shutter 8 so mounted on the cassette casing 3 is slidable between opened and closed positions in a direction parallel to the longitudinal sense of the cassette casing 3 for selectively opening and closing the windows 4, 5a and 5b and is normally biased to the closed position by means of a spring element. The shutter 8 has two openings 8a and 8b defined therein in a row parallel to the longitudinal sense of the cassette casing 3, which openings 8a and 8b can be registered with the head access window 4 and one of the roller access windows, for example, the window 5b so far shown, when the shutter is moved to the opened position as shown in FIG. 11.

Figure 9:
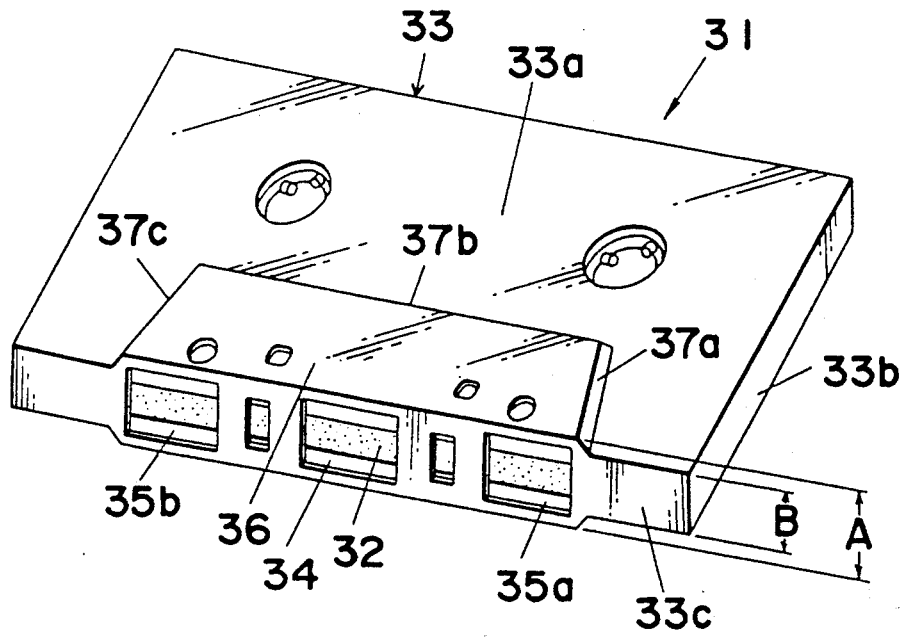
FIG. 9 is a perspective view of the conventional tape cassette.
Figure 10:
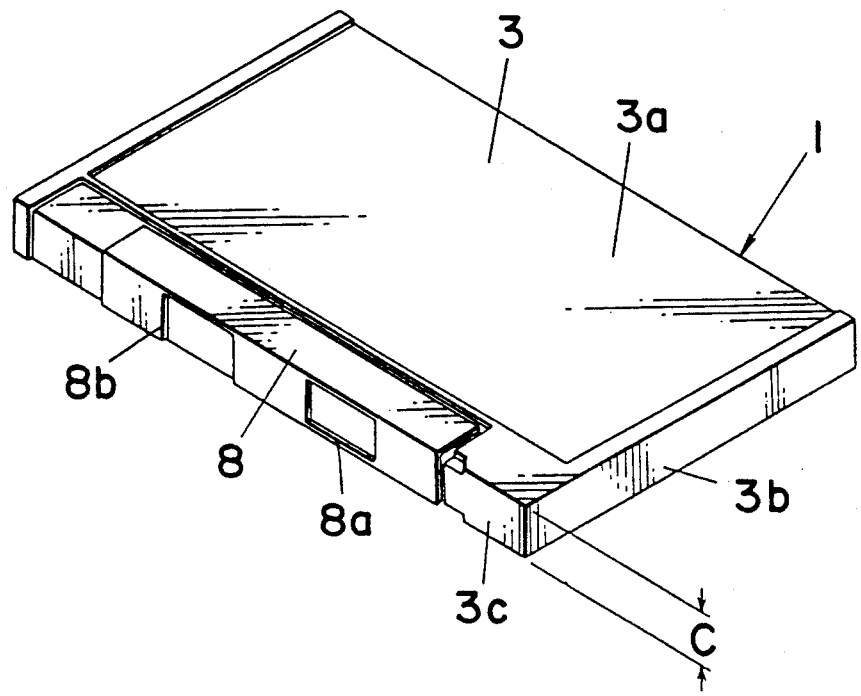
FIGS. 10 and 11 are perspective views of the tape cassette of the different type with a shutter shown in closed and opened positions, respectively.
Figure 11:
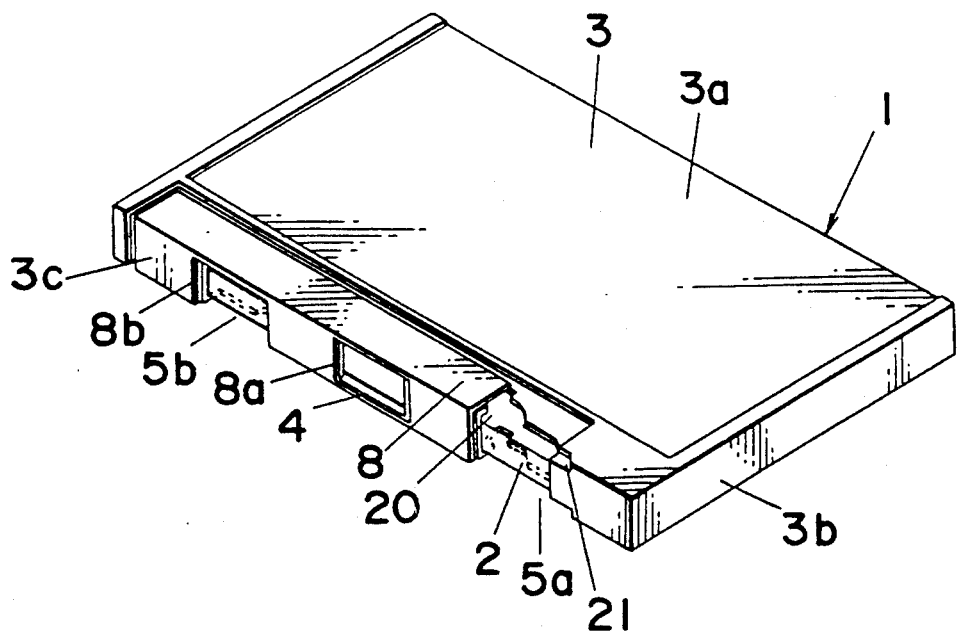

In this modified cassette 1 of the above described construction, all of the peripheral walls, including the front and rear walls and the opposite end walls, of the cassette casing 3 have an equal width as indicated by C in FIG. 10, which is in turn equal to the width B shown in FIG. 9. In other words, the modified cassette 1 has a thickness substantially equal to the minimum thickness of the conventional cassette 31.

For the purpose which will become clear from the subsequent description, a portion of a front edge of the top panel 3a adjacent the roller access window 5b is provided with a guide cutout 21, opening upwardly and frontwardly as viewed in FIGS. 10 and 11, and also with a cammed guide recess 20 extending from the guide cutout 21 and similarly opening upwardly and frontwardly as viewed therein. The cammed guide recess 20 is delimited by a cammed guide face 20a facing frontwardly as viewed in FIG. 3, which face 20a is so positioned and so contoured as will become clear from the subsequent description.

The modified tape cassette 1 of the construction described with particular reference to FIGS. 10 and 11 may be of a type disclosed and claimed in the copending U.S. application entitled "Tape Cassette" and filed Jan. 19, 1991, in the name of Mineo Ohshima and Akinobu Fujikawa Referring now to FIGS. 1 to 8, there is shown the cassette loading mechanism according to a first preferred embodiment of the present invention. The cassette loading mechanism shown therein is of a design capable of operating with any one of the conventional and modified cassettes 31 and 1 and comprises a pair of generally U-sectioned holders 9a and 9b opening towards each other and spaced a distance corresponding to the width of either one of the conventional and modified cassettes 31 and 1, which width is measured in a direction parallel to the generally rectangular box-like configuration of each cassette 31 and 1. These U-sectioned holders 9a and 9b are mounted on a generally strip-shaped holder base 10 so as to extend perpendicular to the longitudinal sense of the holder base 10.

The magnetic recording and/or reproducing head 17 referred to hereinbefore is mounted on the holder base 10 at a location generally intermediate between the holders 9a and 9b and, similarly, a pair of pinch rollers 18a and 18b are mounted thereon through respective pivot levers and located on respective sides of the magnetic recording and/or reproducing head 17. The head 17 and the pinch rollers 18a and 18b all mounted on the holder base 10 are so positioned as to align with the head access window 4 and the roller access windows 5a and 5b in the modified cassette 1 being inserted or with the head access window 34 and the roller access windows 35a and 35b in the conventional cassette 31 being inserted.

Figure 4:
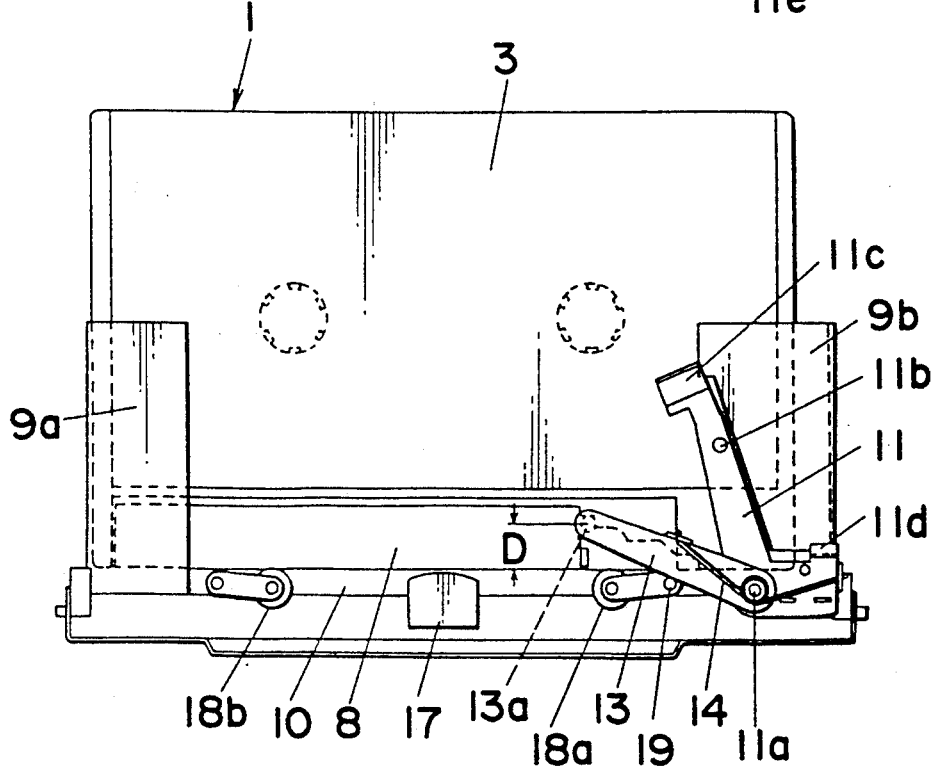
FIG. 4 is a front elevational view of the cassette loading mechanism with the tape cassette of the different type having been inserted.

Each U-sectioned holder 9a and 9b has a pair of flanges opposite to each other and corresponding in position to a pair of arms of the shape of a figure "U", which flanges are spaced a distance corresponding to the thickness of either one of the conventional and modified cassettes 31 and 1. Therefore, it will readily be understood that either one of the conventional and modified cassettes 31 and 1 can be inserted into the cassette loading mechanism to occupy an inserted position as shown in FIG. 4 with opposite end portions thereof guided in and along the respective U-sectioned holders 9a and 9b from above as viewed in FIG. 2.

Figure 3:
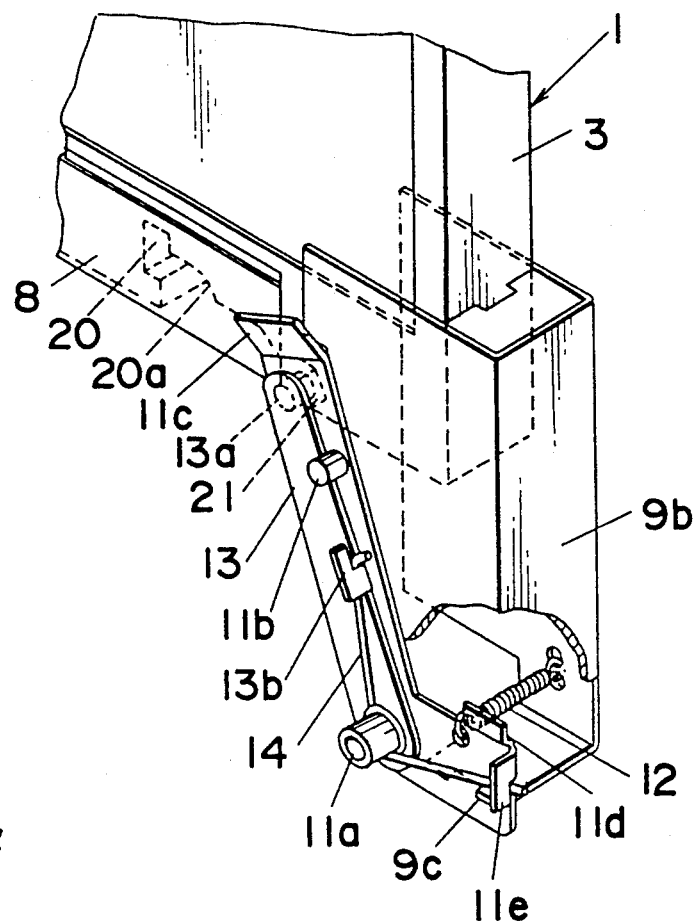
FIG. 3 is a fragmentary perspective view, on an enlarged scale, of a portion of the cassette loading mechanism shown in FIG. 2.

Not only for moving the U-sectioned shutter 8 from the closed position towards the opened position in the event that the modified cassette 1 is inserted into the cassette loading mechanism, but also for identifying which one of the conventional and modified cassettes 31 and 1 is inserted into the cassette loading mechanism, a detecting lever assembly is employed. As best shown in FIG. 3, this detecting lever assembly comprises a generally L-shaped detector lever 11 having first and second ends opposite to each other and also having a stopper 11d defined adjacent the second end, and a pivot lever 13 having first and second ends opposite to each other and operatively carried by the detector lever 11.

As best shown in FIG. 3, the first end of the detector lever 11 is bent so as to extend in a direction outwardly of the adjacent holder 9b thereby to define a feeler 11c, whereas the second end of the L-shaped detector lever 11 is integrally provided with stopper 11d. This detector lever 11 has a pair of bearing slots defined therein adjacent the stopper 11d and is loosely movably supported by the adjacent holder 9b with bearing pawls 9c integral with the holder 9b engaged in the respective slots, so that the detector lever 11 can tilt in a direction close towards and away from the adjacent cassette holder 9b in a plane generally transverse perpendicular to a cassette inserting plane in which the cassette 1 or 31 may be inserted along the cassette holders 9a and 9b. In this condition, the detector lever 11 is biased by a biasing means, for example, a tension spring 12 towards the adjacent holder 9b and is retained in position with the stopper 11d held in abutment with the adjacent holder 9b. It is to be noted that the number of the bearing pawls 9c and, correspondingly, that of the slots in the detector lever 11 for receiving the respective bearing pawls 9c, may not be always limited to two such as shown, but may be one or three or more. In any event, the bearing pawls 9c engaged in the respective slots in the detector lever 11 provides a fulcrum about which the detector lever 11 can tilt in a direction close towards and away from the adjacent cassette holder 9b.

Figure 8:
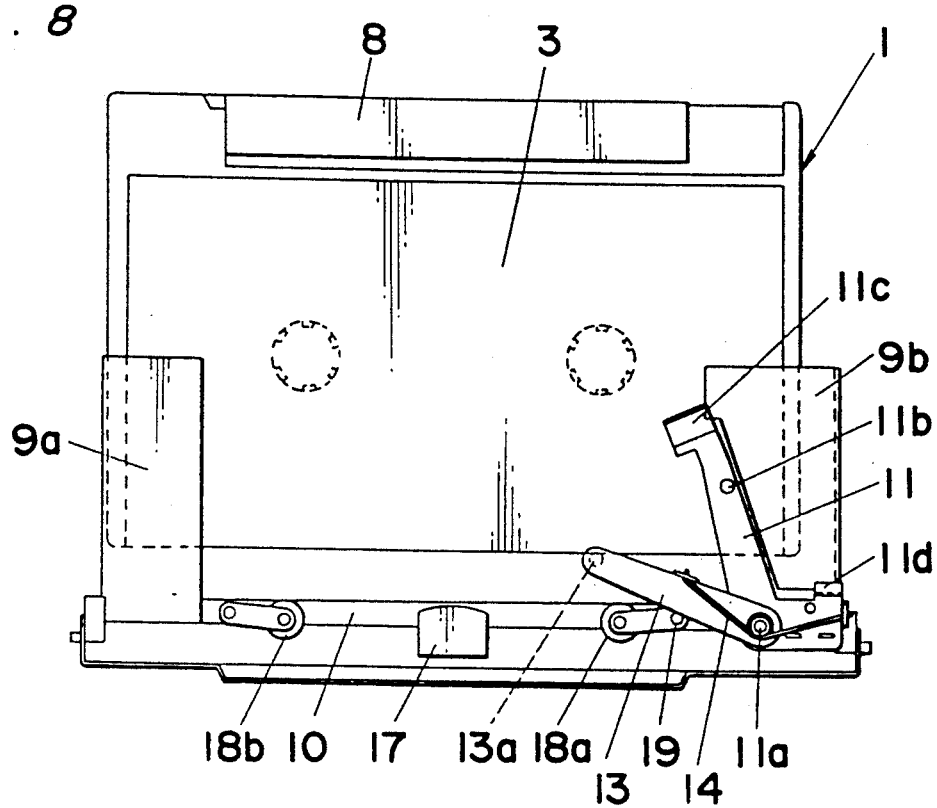
FIG. 8 is a front elevational view of the cassette loading mechanism with the tape cassette of the different type being inserted in the wrong way.

The generally L-shaped detector lever 11 has a generally intermediate bent portion intermediate between the first and second ends thereof and also has a bearing pin 11a secured to the intermediate bent portion thereof so as to protrude in a direction opposite to the adjacent holder 9a. The detector lever 11 further has a stopper pin 11b secured thereto and positioned between the feeler 11c and the bearing pin 11a. The pivot lever 13 has an actuating pin 13a secured to the first end thereof so as to protrude in a direction close towards the adjacent holder 9b for engagement into the guide recess 21 and then into the cammed guide cutout 20 extending from the guide recess 21 in the modified cassette 1. This pivot lever 13 is carried by the detector lever 11 with its second end pivotally mounted on the bearing pin 11a on the detector lever 11 and is, therefore, pivotable about the bearing pin 11a between a first position, in which the pivot lever 13 lies generally parallel to the detector lever 11 while a generally intermediate portion thereof is held in abutment with the stopper pin 11b on the detector lever 11 as shown in FIGS. 1 to 3 and 5, and a second position in which the pivot lever 13 is pivoted counterclockwise about the bearing pin 11a thereby to form an acute angle between it and the detector lever 11 as shown in FIGS. 4 and 8.

The pivot lever 13 is normally biased to the first position by a generally elongated biasing means 14, for example, a sear spring, having opposite ends engaged with the engagement piece 11e integral with the detector lever 11 and a stopper piece 13b integral with the pivot lever 13.

The detecting lever assembly of the construction described above is so positioned and so designed that the pivot lever 13 can be pivoted from the first position towards the second position against a biasing force of the biasing means 14 in response to the insertion of only the modified cassette 1 into the loading mechanism with opposite ends of such modified cassette 1 received in the respective holders 9a and 9b and that, only when the conventional cassette 31 is inserted in a manner similar to the insertion of the modified cassette 1, the detector lever 11 can be tilted about the fulcrum in a direction away from the conventional cassette 31, accompanied by a corresponding tilt of the pivot lever 13 together with the detector lever 11 as will be described in more detail.

It is to be noted that, while the modified cassette 1 is being inserted into the cassette loading mechanism by the application of an external pushing force, the actuating pin 13a on the pivot lever 13 is first engaged into the guide cutout 21 in the modified cassette 1 and, during the continued insertion of the modified cassette 1, the actuating pin 13a is forced to slide from the guide cutout 21 into the cammed guide recess 21 and is then guided along the cammed guide face 20a while causing the pivot lever 13 to pivot from the first position towards the second position. At this time, the actuating pin 13a guided along the cammed guide face 20a causes the shutter 8 to move from the closed position towards the opened position.

The second position to which the pivot lever 13 can be pivoted against the biasing means 14 is defined by a stopper pin 19 carried by the holder base 10 so as to protrude therefrom in a direction required to block the path of movement of the pivot lever 13. The cammed guide face 20a is so shaped and so contoured for a given position of the stopper pin 19 that, when the modified cassette 1 has been completely inserted to a completely inserted position with the shutter 8 consequently moved to the opened position as shown in FIG. 4, the actuating pin 13a then engaged deep into the cammed guide recess 20 will be spaced a predetermined distance D from the front of the modified cassette 1, which distance D is sufficient to allow the magnetic recording and/or reproducing head 17 to slightly protrude into the head access window 4 to engage a length of magnetic tape 2 reeled within the modified cassette 1. In other words, the completely, inserted position referred to above is defined as a position at which the magnetic recording and/or reproducing head 17 can slightly project into the head access window 4 or 34 of either one of the modified and conventional cassettes 1 and 31 for engagement with the length of magnetic tape to effect a magnetic recording or reproduction of information on or from the length of the magnetic tape in a well known manner.

Although not shown, the cassette loading mechanism according to the present invention may be provided with a releasable means for releasably retaining the cassette 1 or 31 in the completely inserted position once the cassette 1 or 31 has been completely inserted. However, so far shown, the assembly so far described is mounted on a machine deck 15 for pivotal movement between upright and laid-down positions. For this purpose, the machine deck 15 has a pair of upright bearing flanges 15a and 15b spaced from each other a distance corresponding to the spacing between the holders 9a and 9b and respective ends of the holders 9a and 9b adjacent the machine deck 15 are pivotally coupled to the associated bearing flanges 15b and 15a by means of a pair of coaxial stud shafts 10b and 10a, respectively. If the tape cassette 1 or 31 in the completely inserted position is laid down together with the holders 9a and 9b, allowing drive and driven hubs 16a and 16b to protrude into and be drivingly coupled with the reels within the cassette 1 or 31, the tape cassette 1 or 31 can be retained in position ready for information to be recorded or reproduced on or from the length of magnetic tape and, therefore, the releasable means may not be always necessary.

The cassette loading mechanism of the above described construction operates in the following manner.

Figure 2:
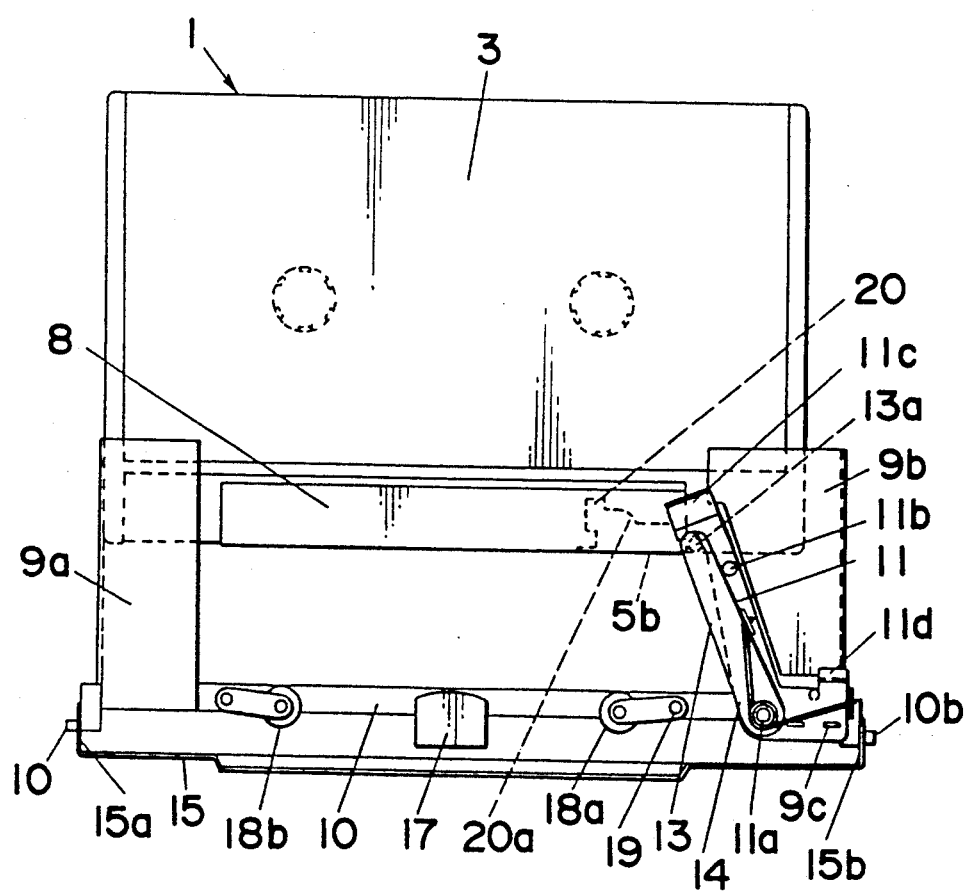
FIG. 2 is a front elevational view of the cassette loading mechanism with a tape cassette of a different type being inserted.
Figures 6, 7A, 7B:
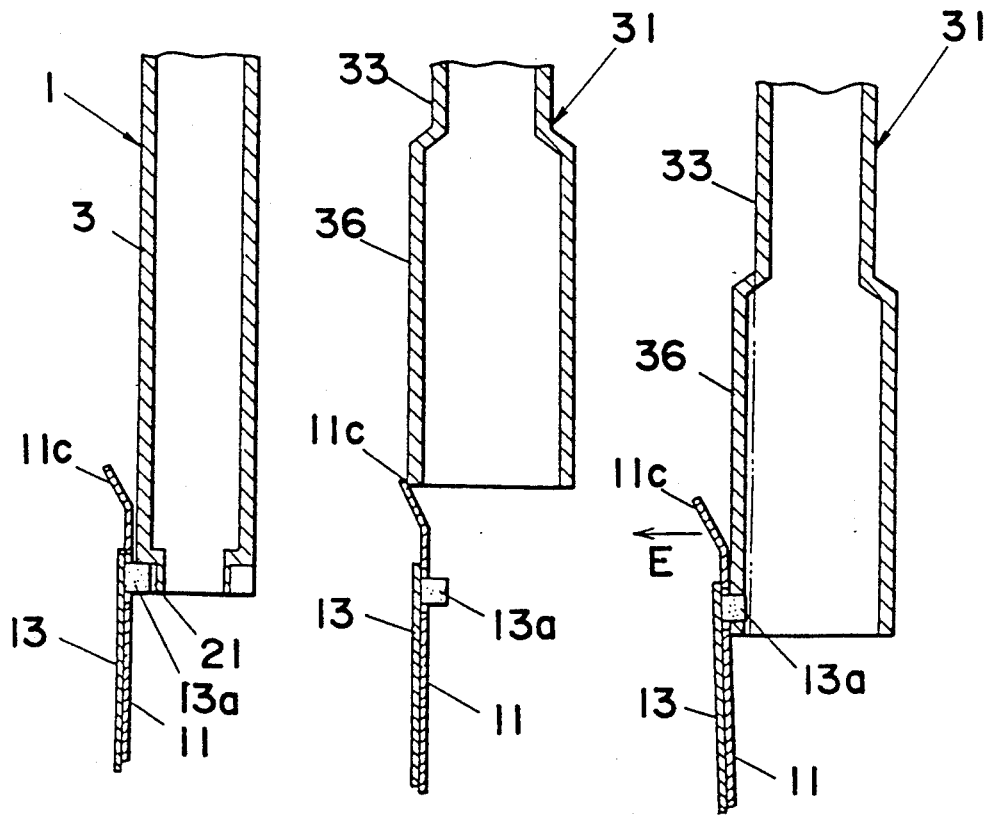
FIG. 6 is a schematic sectional view showing how the tape cassette of the different type cooperates with an element of the cassette loading mechanism.
FIGS. 7(a) and 7(b) are schematic sectional views showing how the conventional tape cassette cooperates with an element of the cassette loading mechanism, with such element shown in different operative positions, respectively.

In the first place, let it be assumed that the modified cassette 1 is loaded. FIGS. 2, 3 and 6 illustrate the modified cassette 1 in a condition ready to be inserted deep into the loading mechanism. In this condition, the actuating pin 13a on the pivot lever 13 is, as best shown in FIG. 6, engaged in the guide cutout 21 in the modified cassette 1. An application of an external pushing force to further insert the modified cassette 1 causes the pivot lever 13 to pivot counterclockwise about the bearing pin 11a against the biasing means 14 while the actuating pin 13a is guided into the cammed guide recess 20 as it is biased by a progressively increasing biasing force of the biasing means 14. The actuating pin 13a engaged in the cammed guide recess 20 is slidingly guided along the cammed guide face 20a while pushing the shutter 8 from the closed position towards the opened position.

When the modified cassette 1 has been completely inserted to occupy the completely inserted position as shown in FIG. 4, the shutter 8 is moved to the opened position allowing portions of the length of magnetic tape 2 to be exposed to the outside through the windows 4, 5a and 5b and the magnetic recording and/or reproducing head 17 and the pinch rollers 18a and 18b are held in contact with those portions of the length of magnetic tape 2 in a manner well known to those skilled in the art. For actual information recording or reproduction, the modified cassette 1 in the completely inserted position may be laid down together with the assembly including the holders 9a and 9b and the holder base 10 with the head 17 and the pinch rollers 18a and 18b mounted thereon.

Figure 5:
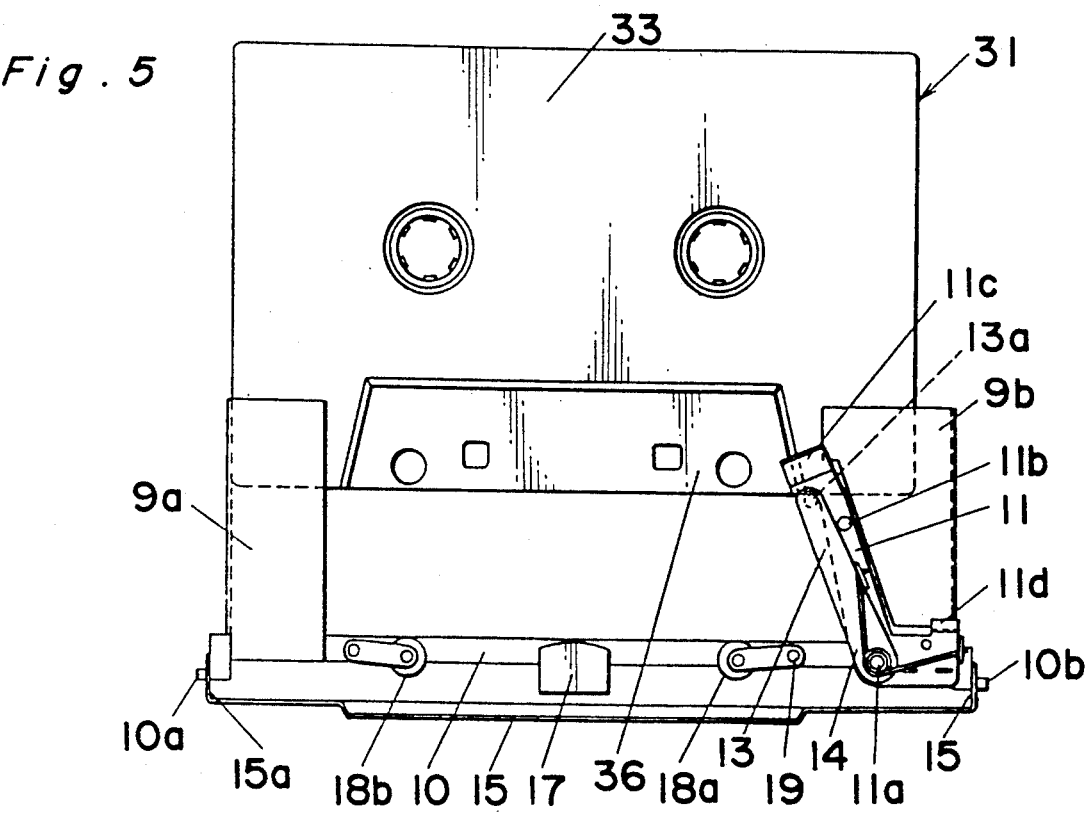
FIG. 5 is a front elevational view of the cassette loading mechanism with a conventional tape cassette being inserted.

FIGS. 5 and 7 illustrate the conventional cassette 31 in a condition ready to be inserted deep into the loading mechanism. As best shown in FIG. 7(a), just after the conventional cassette 31 has been received in between the holders 9a and 9b, one of opposite front edges of the raised portions of the top and bottom walls 33a of the conventional cassette 31 is brought into contact with the feeler 11c of the detector lever 11 and, as the conventional cassette 31 is further inserted, the feeler 11c rides over the bulged portion 36 in the conventional cassette 31 while tilting in a direction, shown by the arrow E, away from the conventional cassette 31 together with the pivot lever 13, thereby to allow the front of the conventional cassette 31 to pass clear of the actuating pin 13a and towards the completely inserted position as best shown in FIG. 7(b). This is possible because the actuating pin 13a is so selected as to have a length equal to or slightly smaller than the sum of the thickness of the detector lever 11 plus the amount of protrusion of the bulged portion of either one of the top and bottom walls 33a from the remaining portion of the corresponding wall 33a of the conventional cassette 31.

Thereafter, the actuating pin 13a will pass clear until the conventional cassette 31 is completely inserted.

FIG. 8 illustrates the modified cassette 1 having been inserted in the wrong way, i.e., with the shutter 8 facing in a direction away from the magnetic recording and/or reproducing head 17. In the event that the modified cassette 1 is inserted with its rear oriented towards the magnetic head 17, that is, the shutter 8 facing in the direction away from the magnetic head 17, the pivot lever 13 is pivoted from the first position towards the second position with the actuating pin 13a engaged with a rear edge of the modified cassette 1. However, the rear of the modified cassette 1 does not contact the magnetic head 17 because, when the pivot lever 13 is pivoted to the second position at which it is engaged with the stopper pin 19, a substantial clearance is formed between the rear wall of the cassette shell 3 and the magnetic head 17 as clearly shown in FIG. 8.

A similar description as above is equally applicable where the conventional cassette 31 is inserted in the wrong way, i.e., with the perforated and bulged region of the front wall 33c of the cassette shell 33 oriented in a direction away from the magnetic head 17.

In the foregoing embodiment of the present invention, the detecting lever assembly has been described as comprised of the detecting lever 11 and the pivot lever 13. However, the detecting lever assembly may comprise a single pivot lever, an example of which will now be described in connection with a second preferred embodiment of the present invention with reference to FIGS. 12 to 15.

Figure 12:
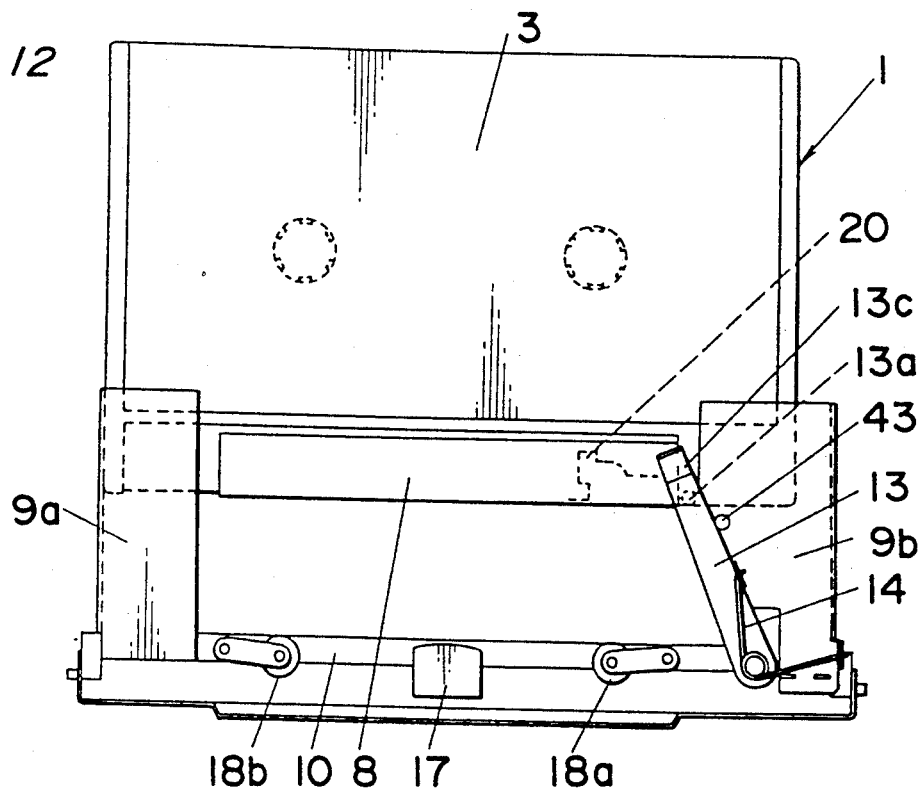
FIG. 12 is a front elevational view of a modified cassette loading mechanism according to a second preferred embodiment of the present invention with the tape cassette of the different type being inserted.
Figure 13:
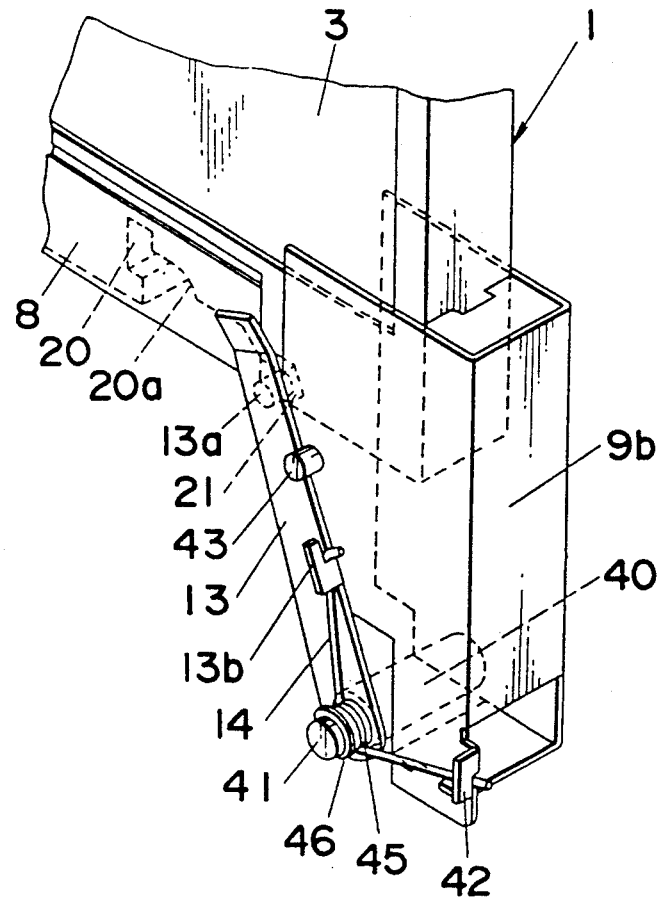
FIG. 13 is a perspective view, on an enlarged scale, of a portion of the modified cassette loading mechanism.

Referring first to FIGS. 12 and 13, the holder 9b has a bearing post 40 secured to a lower end thereof so as to protrude in a direction perpendicular to the direction of insertion of either one of the conventional and modified cassettes 31 and 1. The pivot lever 13 shown therein is pivotally mounted at its second end on the bearing post 40 on a bearing pin 41 secured in any suitable manner to a free end of the bearing post 40 in coaxial fashion therewith and is, therefore, pivotable between the first and second positions about the bearing pin 41 in a manner similar to that in the foregoing embodiment.

Figure 15:
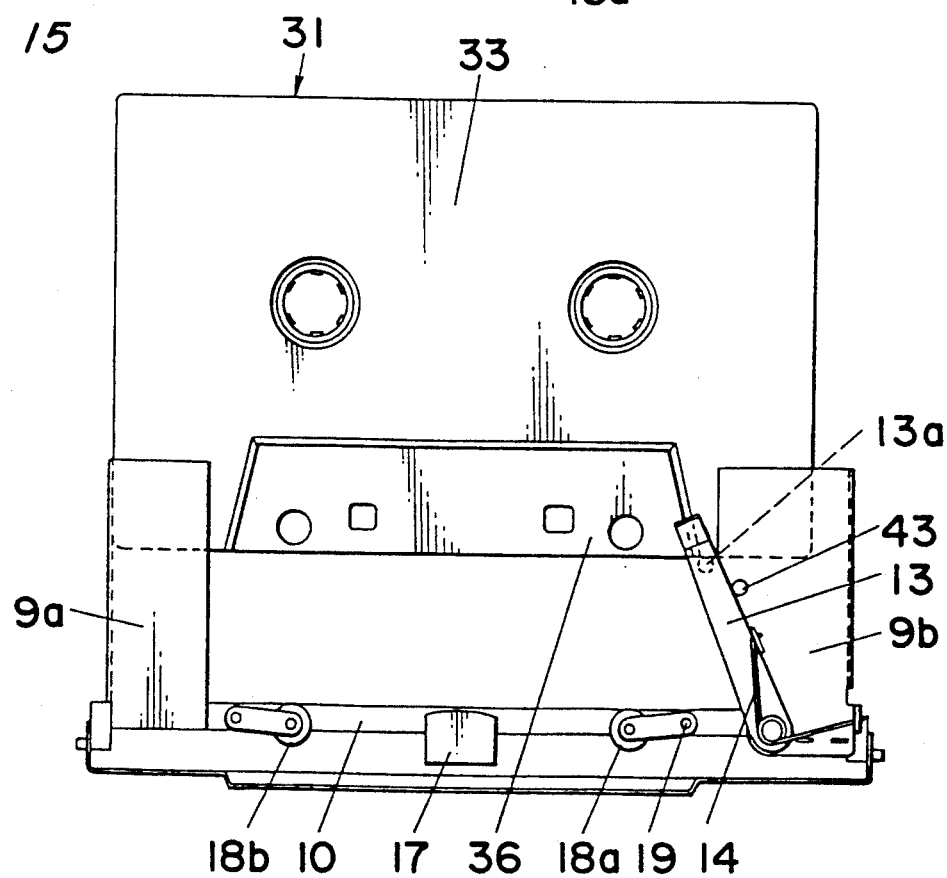
FIG. 15 is a front elevational view of the modified cassette loading mechanism with the conventional tape cassette being inserted.

The first end of the pivot lever 13 adjacent the actuating pin 13a is bent so as to extend in a direction outwardly of the adjacent holder 9b thereby to define a feeler 13c which is a functional equivalent of the feeler 11c in the detector lever 11 used in the previously described embodiment of the present invention. The biasing means 14 used in this second preferred embodiment of the present invention for normally urging the pivot lever 13 to the first position as shown in FIGS. 12, 13 and 15 is in the form of a sear spring of one-piece construction comprising a compression spring portion 45 and a pair of spring arms radially outwardly extending from the compression spring portion 45. This biasing means 14 is loosely mounted on the bearing pin 41 with the compression spring portion 45 retained in position between a washer 46 and the bearing post 40 while one spring arm is engaged with the stopper piece 13b integral with the pivot lever 13 and the other spring arm is engaged with an engagement projection 42 integral with the holder 9b as best shown in FIG. 13.

To retain the pivot arm 13 at the first position as biased by the biasing means 14, a stop pin 43 is secured to the holder 9b so as to protrude outwardly therefrom in a manner similar to the stop pin 11b which has been described as secured to the detector lever 11 according to the foregoing embodiment of the present invention.

The pivot lever 13 used in the practice of the second preferred embodiment of the present invention is not only pivotable between the first and second positions as is the case with the pivot lever 13 used in the foregoing embodiment, but also tiltable in a plane generally perpendicular to the plane in which it pivots between the first and second positions. This is possible because, while the second end of the pivot lever 13 is mounted on the bearing post 40 on the bearing pin 41, the compression spring portion 45 of the biasing means 14 applies a biasing force to the second end portion of the pivot lever 13, which biasing force can be overcome when an external force tending to tilt the pivot lever 13 is applied to the feeler 13c of the pivot lever 13.

The cassette loading mechanism according to the second preferred embodiment of the present invention functions in a manner similar to that according to the first preferred embodiment of the present invention. Specifically, assuming that the modified cassette 1 has been inserted as shown in FIGS. 12 and 13, a further application of the external pushing force on the cassette shell 3 causes the pivot lever 13 with the actuating pin 13a then engaged in the guide cutout 21 in the modified cassette 1, to pivot counterclockwise about the bearing pin 41 against the biasing means 14 and is subsequently guided into the cammed guide recess 20. The actuating pin 13a engaged in the cammed guide recess 20 to be slidingly guided along the cammed guide face 20a while pushing the shutter 8 from the closed position towards the opened position.

Figure 14:
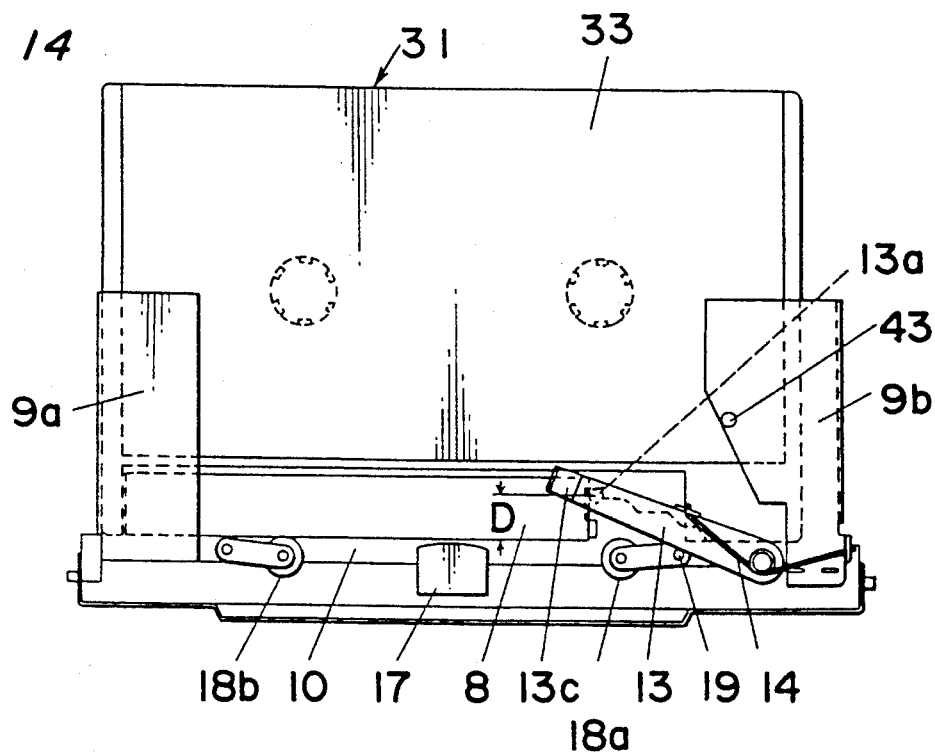
FIG. 14 is a front elevational view of the modified cassette loading mechanism with the tape cassette of the different type having been inserted.

When the modified cassette 1 has been completely inserted to occupy the completely inserted position as shown in FIG. 14, not only is the pivot lever 13 moved to the second position, but also the shutter 8 is moved to the opened position allowing portions of the length of magnetic tape 2 to be exposed to the outside through the windows 4, 5a and 5b as is the case with that in the foregoing embodiment.

On the other hand, in the event that the conventional cassette 31 is loaded as shown in FIG. 15, one of the opposite front edges of the raised portions of the top and bottom walls 33a of the conventional cassette 31 is brought into contact with the feeler 13c of the pivot lever 13 and, as the conventional cassette 31 is further inserted, the feeler 13c rides over the bulged portion 36 in the conventional cassette 31 while tilting in a direction away from the conventional cassette 31 against a biasing force of the compression spring portion 45 of the biasing means 14 thereby to allow the front of the conventional cassette 31 to pass clear of the actuating pin 13a and towards the completely inserted position.

Thereafter, the actuating pin 13a will pass clear until the conventional cassette 31 is completely inserted.

Should any one of the conventional and modified cassettes 31 and 1 be loaded in the wrong way, the cassette loading mechanism according to the second preferred embodiment of the present invention operates in a manner similar to that described with reference to FIG. 8.

From the foregoing description, it is clear that the cassette loading mechanism according to the present invention is operable with either one of the conventional and modified tape cassettes for recording or reproducing information on and from a length of tape reeled within such cassette.

Although the present invention has been described in connection with the preferred embodiments thereof with reference to the accompanying drawings, it is to be noted that various changes and modifications will be apparent to those skilled in the art. For example, while the assembly including the holder 9a and 9b and the holder base 10 with the magnetic head 17 thereon has been described as pivotable between the erected and laid-down positions about the coaxial stud shafts 10a and 10b, the assembly may be so designed and so positioned that, while the assembly lies parallel to and spaced above the machine deck 15, it can be lowered down close to the machine deck after the cassette has been completely inserted.

Accordingly, such changes and modifications are to be understood as included within the scope of the present invention as defined by the appended claims, unless they depart therefrom.

What is claimed is:

1. A cassette loading mechanism operable with either one of first and second type cassettes each accommodating therein a reeled magnetic recording tape, the first type cassette being of a type having a uniform thickness and a head access window and at least one roller access window defined at a front thereof and also having a normally closed slide shutter for selectively opening and closing both the head and roller access windows, the second type cassette being of a type having a head access window and at least one roller access window defined at a bulged region at a front thereof and having maximum and minimum thicknesses, the maximum thickness being represented by the bulged region, said cassette loading mechanism comprising:

a cassette holding means comprising a pair of holders spaced from each other a distance corresponding to a width of either one of the first and second type tape cassettes, either one of the first and second type tape cassettes being capable of being inserted along the holders in a cassette inserting plane to a completely inserted position with opposite end portions thereof slidably received thereby;

a lever means carried by the cassette holding means for movement in a plane parallel to said cassette inserted plane between first and second positions and also for movement in a direction generally transverse to said cassette inserting plane;

a biasing element biasing said lever means toward the first position; and an actuating element carried by the lever means for movement together therewith, said actuating element being engagable with the slide shutter of a first type cassette to move the slide shutter from a normally closed position towards an opened position as the lever means is moved from the first position towards the second position, and said actuating element being at a position in the direction between said holders corresponding to other than a bulged portion of a second type cassette being inserted into said holders;

said lever means being moved from the first position towards the second position in response to an insertion of only a first type tape cassette towards the completely inserted position; and said lever means having a portion engagable by a bulged region of a second type tape cassette for being moved in a direction transversely away from said cassette inserting plane when a second type tape cassette is inserted to allow the region of the second type tape cassette having the minimum thickness to pass clear of said actuating element during the insertion of a second type tape cassette towards the completely inserted position.

2. A cassette loading mechanism operable with either one of first and second type tape cassettes each accommodating therein a length of magnetic tape, the first type tape cassette having a predetermined thickness and a first type cassette shell of generally rectangular box-like configuration including a pair of first end portions opposite to each other in a direction longitudinally thereof; first front and rear portions each parallel to a longitudinal sense thereof, the first front portion having a perforated region of a width substantially equal to the remaining region of the first front portion and also to the predetermined thickness; a first head access window defined in the perforated region of the first front portion of the first type cassette shell for the access of a magnetic recording and/or reproducing head to the length of magnetic recording tape within the first type tape cassette; at least one first roller access window defined in the perforated region of the first front portion of the first type cassette shell in the neighborhood of the first head access window; a normally closed slide shutter slidably mounted on the first front portion of the first type tape cassette for movement between opened and closed positions for selectively opening and closing both of the first head and roller access windows; and a first biasing element for biasing the slide shutter to the closed position;

the second type tape cassette having maximum and minimum thicknesses, the minimum thickness being substantially equal to the predetermined thickness of the first type tape cassette, and having a second type cassette shell of generally rectangular box-like configuration having a pair of second end portions opposite to each other in a direction longitudinally thereof; second front and rear portions each parallel to the longitudinal sense thereof, the second front portion having an outwardly bulged region of a width greater than the width of the first front portion of the first type tape cassette and also than that of the remaining region of the second front portion thereof, the width of the bulged region representing the maximum thickness of the second type tape cassette; a second head access window defined in the bulged region of the second front portion for the access of the magnetic head to a length of magnetic recording tape within the second type cassette shell; and at least one second roller access window defined in the bulged region of the second front portion in the neighborhood of the second head access window;

said cassette loasing mechanism comprising:

a cassette holding means comprising a pair of holders spaced from each other a distance corresponding to the length of either one of the first and second type tape cassettes, either one of the first and second type tape cassettes being capable of being inserted along the holders in a cassette inserting plane to a completely inserted position with the opposite end portions slidably received thereby;

a lever means carried by the cassette holding means for movement in a plane parallel to said cassette inserting plane between first and second positions and also for movement in a direction generally transverse to said cassette inserting plane;

a biasing element biasing said lever means toward the first position; and an actuating element carried by the lever means for movement together therewith, said actuating element being engagable with the slide shutter on a first type cassette to move the slide shutter from the closed position towards the opened position as the lever means is moved from the first position towards the second position, and said actuating element being at a position in the direction between said holders corresponding to other than a bulged portion of a second type cassette being inserted into said holders;

said lever means being moved from the first position towards the second position in response to an insertion of only a first type tape cassette towards the completely inserted position; and said lever means having a portion engagable by a bulged region of a second type tape cassette for being moved in a direction transversely away from said cassette inserting plane when a second type tape cassette is inserted to allow the remaining region of the second front portion of the second type tape cassette to pass clear of said actuating element during the insertion of a second type tape cassette towards the comletely inserted position.

3. The cassette loading mechanism as claimed in claim 2, wherein said lever means comprises a detector lever displaceable in a direction away from the cassette inserting plane, and a pivot lever pivotable between the first and second positions and having the actuating element secured thereto.

4. The cassette loading mechanism as claimed in claim 2, wherein said lever means comprises a pivot lever pivotable between the first and second positions and also displaceable in a direction away from the cassette inserting plane, and wherein said actuating element is secured to said pivotable lever.

5. The cassette loading mechanism as claimed in claim 2, further comprising a restricting means engageable with the rear portion of either one of the first and second type tape cassette to hold the tape cassette at a position with the rear portion thereof spaced a distance from the magnetic recording and/or reproducing head in the event that either one of the first and second type tape cassettes is inserted in a wrong way.

* * * * *